INVENTOR:
SAMUEL LEVEN
BY Charles F. Osgood,
ATTORNEY

June 7, 1960 S. LEVEN 2,939,197
CHUCK MECHANISM FOR DRILL PIPE
Filed Sept. 5, 1956 2 Sheets-Sheet 2
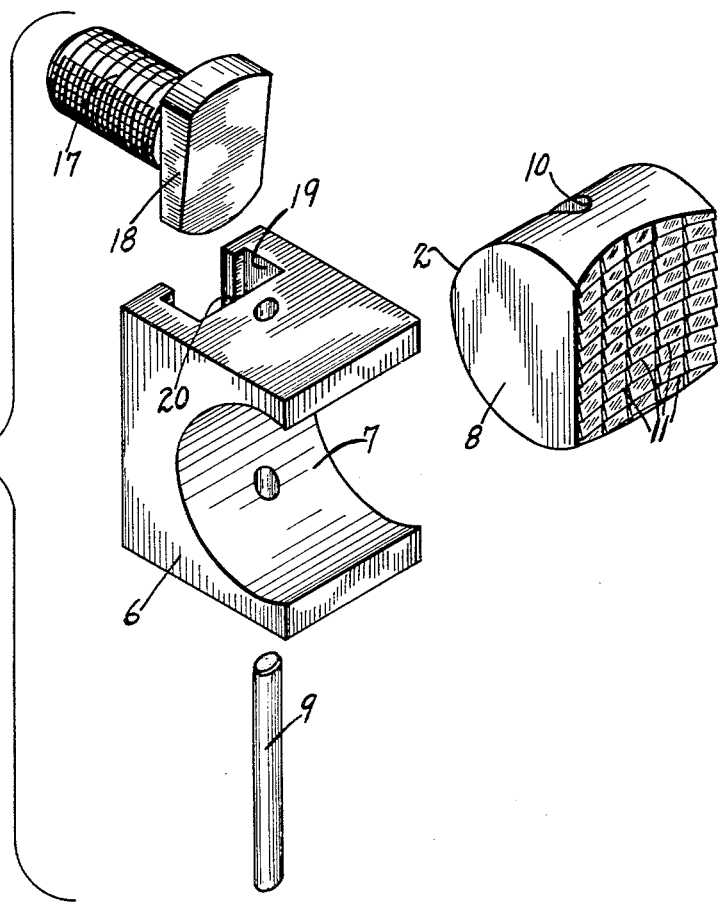
INVENTOR:
SAMUEL LEVEN
BY Charles F. Osgood
ATTORNEY

United States Patent Office

2,939,197
Patented June 7, 1960

2,939,197

CHUCK MECHANISM FOR DRILL PIPE

Samuel Leven, Michigan City, Ind., assignor to Joy Manufacturing Company, Pittsburgh, Pa., a corporation of Pennsylvania Filed Sept. 5, 1956, Ser. No. 608,013

4 Claims. (Cl. 24—263)

This invention relates to chuck mechanisms and more particularly to a chuck mechanism for gripping the drill pipe of an earth drilling apparatus such as a blast hole drill.

In drilling apparatus of a known type the drill chuck is moved vertically by a feeding means and the chuck jaws serve to connect the drill pipe to the feeding means for feeding movement toward the work. In such known types of drill chuck the chuck jaws do not at all times adequately grip the pipe due to irregularities or bent pipe sections and in the event the jaws tend to slip no means is usually provided for further automatically tightening the jaws. The present invention contemplates improvements over such known types of chuck mechanisms in that the chuck jaws adequately grip the pipe irrespective of any irregularities of the pipe and automatic tightening means is provided for the chuck jaws to preclude the possibility of slippage.

An object of the present invention is to provide an improved chuck mechanism for gripping the drill pipe of a drilling apparatus. Another object is to provide improved movable mounting means for the chuck jaws whereby the latter may firmly grip the drill pipe even when the latter is bent or has other irregularities. Still another object is to provide an improved wedge means associated with the jaw adjusting means whereby the possibility of slippage of the jaws is substantially reduced. These and other objects and advantages of the invention will, however, hereinafter more fully appear in the course of the ensuing description.

In the accompanying drawings there is shown for purposes of illustration one form which the invention may assume in practice.

In these drawings:

Fig. 3 is an exploded view of one of the chuck jaws and its mounting.

Figure 1:
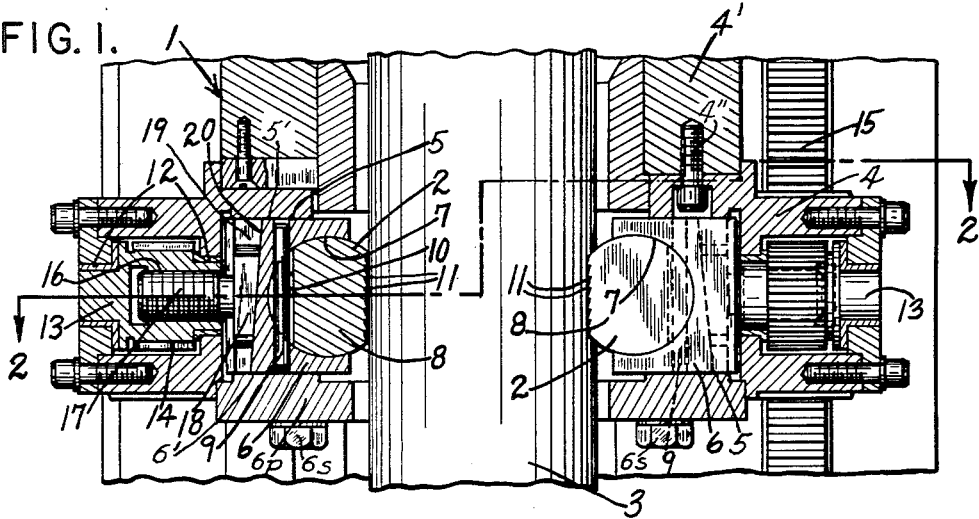
Fig. 1 is a vertical section taken through a chuck mechanism constructed in accordance with a preferred illustrative embodiment of the invention.
Figure 2:
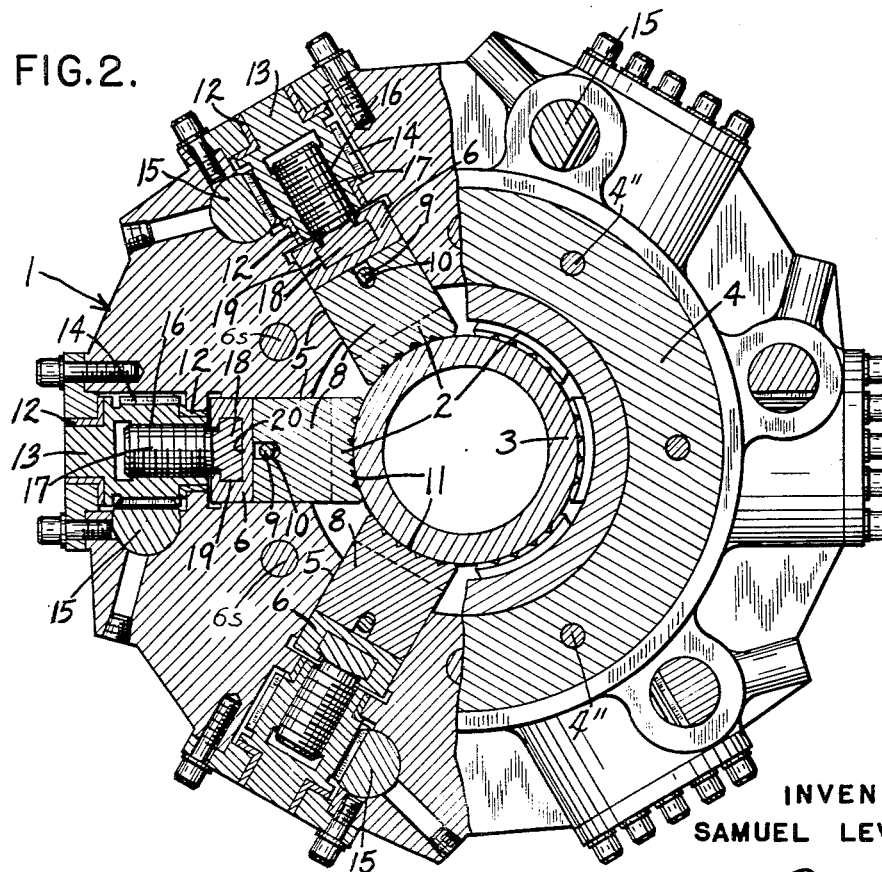
Fig. 2 is a horizontal section taken on line 2—2 of Fig. 1.

In this illustrative construction, as shown in the drawings, the chuck mechanism generally designated 1 has jaws 2 for gripping a drill pipe 3.

The chuck comprises a casing 4 fixed to a frame element 4' as by bolts or screws 4" and the casing has radial guideways 5 in which the chuck jaws are guided for rectilinear movement toward and from the drill pipe. The frame element 4' is supported for vertical movement and is adapted to be fed vertically by means of the usual feeding means of an earth drilling apparatus which may be of the character disclosed in Patent No. 2,586,784, dated February 26, 1952, owned by the assignee of the present invention.

The chuck jaws include supporting blocks 6 guided in the radial guideways 5 and these blocks are mounted for limited vertical movement between a top inner surface 5' on the casing 4 and a bottom inner surface 6' provided by an annular plate 6p secured as by screws 6s to the casing 4. Each block is traversed by a curved recess or socket 7 in which a curved portion of a jaw element 8 is guided for limited rocking movement in a vertical plane. Vertical pins 9 secured to the blocks pass with clearance through grooves 10 in the jaw elements to hold the jaw elements against lateral release from their recesses within the blocks 6 while permitting limited freedom of rocking movement of the jaw elements in view of the clearance provided between the pins 9 and the grooves 10 in the jaw elements. The jaw elements have transverse, curved gripping teeth 11 for gripping the curved exterior periphery of the cylindrical drill pipe as the chuck is fed downwardly.

The chuck casing has journaled thereon in bearings 12 the shaftlike portions 13 of gears 14, and power operated racks 15 vertically guided on the casing mesh with these gears and serve to rotate the gears in a known manner. Threadedly connected at 16 within the gears are feeding or adjusting screws 17 having T-shaped heads 18 engaged in correspondingly shaped guideways 19 within the blocks 6. Thus the gears, when rotated, serve as nuts for moving the screws axially to move the jaws inwardly initially to position the latter in gripping contact with the drill pipe. The heads 18 are wedge-shaped and wedge against inclined surfaces 20 on the blocks so that in the event a tendency to slip of the jaws as the chuck is fed downwardly occurs the wedgelike heads of the screws move vertically relative to the blocks to cause the blocks to be forced or wedged inwardly to maintain the jaws in firm gripping contact with the drill pipe. As the chuck is fed downwardly, in the manner disclosed in the patent above referred to, the drill pipe is placed in compression for forcing the drill bit downwardly at high pressure against the hole-bottom, and as above described, as downward chuck movement is initiated the jaws firmly grip the drill pipe to cause movement of the latter with the chuck. When the feed is reversed the jaws automatically release and similar jaws, reversely disposed, will grip the pipe to raise the latter in the hole. Such reverse jaws are well-known in the type of chuck disclosed.

As a result of this invention an improved chuck mechanism is provided having gripping jaws including jaw elements which are loosely mounted for limited rocking movement thereby to enable the jaws to grip firmly the irregular exterior surface of a drill pipe. By the provision of the improved jaw adjusting means embodying the wedgelike elements coacting with inclined surfaces on the jaw supporting blocks the possibility of slippage of the jaws is substantially reduced. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A chuck mechanism comprising a casing providing a guideway, a block guided for movement along said guideway toward and from gripping position, said guideway providing for limited movement of said block normal to said guideway, a gripping jaw element mounted on said block for limited free oscillatory movement relative thereto whereby said jaw element may align itself with respect to the work, and means for moving said block along said guideway to move said jaw element toward gripping position and embodying means for guiding said block whereby it may move normal to said guideway to effect an additional moving force to be applied to said jaw element to provide for an increased gripping action.

2. A chuck mechanism as set forth in claim 1 wherein said block moving means comprises an adjusting device acting on said block and said additional moving means including a wedge mechanism interposed between said adjusting device and said block.

3. A chuck mechanism as set forth in claim 2 wherein said block moving means comprises an adjusting screw device and said additional moving means comprises a wedgelike head on said adjusting device and a coacting inclined wedge engaging surface on said block whereby movement of said block normal to said guideway effects relative movement of said wedgelike head and inclined wedging surface to apply an increase gripping force to said jaw element toward gripping position.

4. A chuck mechanism as set forth in claim 1 wherein means is provided for retaining said jaw element on said block, said block having a concave seat and said jaw element having a curved surface engaging said seat whereby limited free oscillatory movement of said jaw element is afforded, said retaining means including a pin on said block passing through a groove cut through the curved surface of said jaw element, said pin and groove cooperating to prevent endwise displacement of said jaw element from said concave block seat while permitting oscillation of said jaw element as aforesaid.

References Cited in the file of this patent

UNITED STATES PATENTS

| 1,446,060 | Pratt | Feb. 20, 1923 |
| 1,460,567 | Barnard | July 3, 1923 |
| 1,966,454 | Moody | July 17, 1934 |
| 2,419,711 | Dillon | Apr. 29, 1947 |
| 2,564,119 | Matthews | Aug. 14, 1951 |
| 2,570,308 | Beeth | Oct. 9, 1951 |